United States Patent
King et al.

(10) Patent No.: US 6,415,158 B1
(45) Date of Patent: Jul. 2, 2002

(54) DUAL MODE MOBILE PHONE OPERATING AS A TWO-WAY RADIO

(75) Inventors: William Clifton King, Morris; Gregg Scott Nardozza, Sussex, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/240,578

(22) Filed: Feb. 1, 1999

(51) Int. Cl.[7] ................................................ H04B 1/40
(52) U.S. Cl. ...................................... 455/552; 455/553
(58) Field of Search ................................. 455/552, 553, 455/426, 462, 464, 465, 82, 83, 461, 512

(56) References Cited

U.S. PATENT DOCUMENTS

| | | |
|---|---|---|
| 5,475,677 A | 12/1995 | Arnold et al. |
| 5,663,957 A | 9/1997 | Dent |
| 5,778,320 A * | 7/1998 | Drozt et al. ................. 455/509 |
| 5,812,951 A | 9/1998 | Ganesan et al. |
| 5,896,562 A * | 4/1999 | Heinonen ..................... 455/76 |
| 6,072,996 A * | 6/2000 | Smith ........................ 455/189.1 |
| 6,088,348 A * | 7/2000 | Bell, III et al. ............. 370/343 |
| 6,151,501 A * | 11/2000 | Belkin et al. ................ 455/436 |

FOREIGN PATENT DOCUMENTS

| | | |
|---|---|---|
| DE | 19704907 | 7/1997 |
| EP | 0793356 | 9/1997 |

* cited by examiner

*Primary Examiner*—Lee Nguyen
(74) *Attorney, Agent, or Firm*—Harness, Dickey & Pierce, P.L.C.

(57) ABSTRACT

A dual mode transmitter/receiver adds two-way radio functionality to a frequency division duplex mobile phone. The dual mode transmitter/receiver allows short-range and low-power communication between similarly equipped phones. In the two-way radio mode, the dual mode mobile phone transmits and receives at a frequency between the normal mobile transmit and receive frequency bands so that a number of transmitter/receiver components are utilized for both normal and two-way radio communication.

22 Claims, 4 Drawing Sheets

DUAL MODE MOBILE PHONE OPERATING AS A TWO-WAY RADIO

BACKGROUND OF THE INVENTION

1. Field of the Invention

The present invention relates to a dual mode mobile phone ("mobile") which transmits and receives radio frequency (RF) signals during normal operation using frequency division duplexing, and operates as a two-way radio during a supplemental operating mode.

2. Description of Prior Art

Consumer demand and competition in the wireless communications industry has driven a rapid evolution in cellular phone technology. Analog mobiles introduced in the early 1980s are being replaced by digital technology which offers enhanced quality, security, and efficient spectrum use.

Using PCS (personal communication services) devices as an example, service providers are now able to attract cellular customers by offering an expanded variety of services, such as voicemail, short message service, and personal call management (i.e., providing a single telephone number for a user's home, mobile, and office). Although it is desirable to offer these and other services to cellular customers, it is also desirable to minimize the effect of such services on the cost, size, and convenience of the mobile.

SUMMARY OF THE INVENTION

The present invention adds two-way radio functionality to a frequency division duplex mobile in an efficient manner. The user of the dual mode mobile according to the present invention switches between a normal operating mode, for cellular service, and a two-way radio mode (also referred to herein as "walkie-talkie," or "W-T" mode) which enables short-range, low-power communication with similarly equipped phones without using the service provider's cellular infrastructure (i.e., without transmitting or receiving to/from a cellular network base station). In W-T mode, the dual mode mobile transmits and receives at frequencies between the mobile's normal transmit and receive frequency bands. By utilizing these in-between frequencies, numerous transmitter/receiver components are used for both normal cellular communication and during W-T mode, thereby allowing design efficiencies to minimize the cost and size of the dual mode mobile.

DETAILED DESCRIPTION

The following detailed description relates to a dual mode mobile which transmits and receives RF communication signals using frequency division duplexing during a normal operating mode, and which functions as a two-way radio in a supplemental operating mode by transmitting and receiving at a frequency in-between the normal mobile transmit and receive frequency bands.

Figure 1:
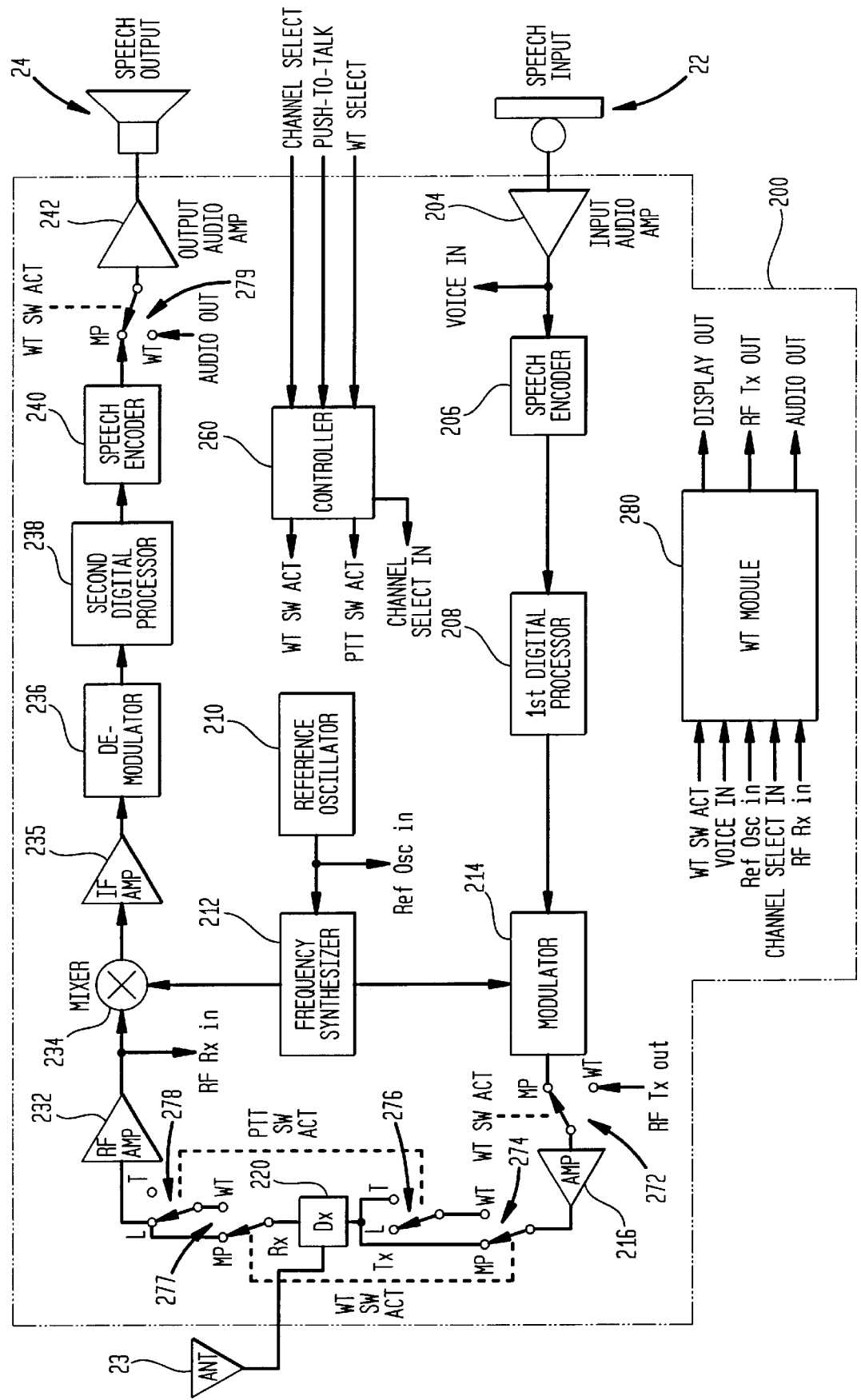
FIG. 1 is a block diagram of a dual mode mobile according to a disclosed embodiment of the present invention.

FIG. 1 is a block diagram of a dual mode mobile in accordance with an embodiment of the present invention. As shown in FIG. 1, the dual mode mobile includes an antenna 23, a speech output (e.g., a speaker) 24, a speech input (e.g., a microphone) 22, and a dual mode transmitter/receiver 200. It will be clear to one skilled in the art that the mobile of FIG. 1 includes additional components, such as a battery, logic circuitry, a display processor, etc. Since an explanation of such elements is not necessary for an understanding of the present invention, these components are not illustrated in the Figures or discussed herein.

As seen in FIG. 1, the dual mode transmitter/receiver 200 includes a duplexer 220 connected to the antenna 23 to receive and transmit RF communication signals via the antenna 23. Frequency division duplexing allows cellular customers to simultaneously listen and speak by transmitting and receiving at frequencies in separate frequency bands.

Figure 2:
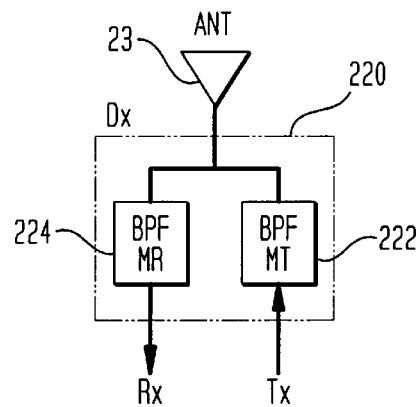
FIG. 2 illustrates a duplexer configuration for filtering out frequencies outside the mobile transmit and mobile receive frequency bands.

FIG. 2 illustrates a typical duplexer configuration which is suitable for implementing the duplexer 220 of the present invention. As illustrated in FIG. 2, the duplexer 220 includes a mobile transmit band pass filter (BPF MT) 222 which receives an RF transmit (Tx) signal from the mobile's transmitter circuitry, filters out frequencies in Tx which are above and below the mobile transmit band boundaries, and outputs the result to the antenna 23. The duplexer 220 further includes a mobile receive band pass filter (BPF MR) 224 which receives RF reception signals from the antenna 23, filters out frequencies above and below the normal mobile receive band boundaries, and outputs the resulting (Rx) signal to the mobile's receiver circuitry.

Figure 3:
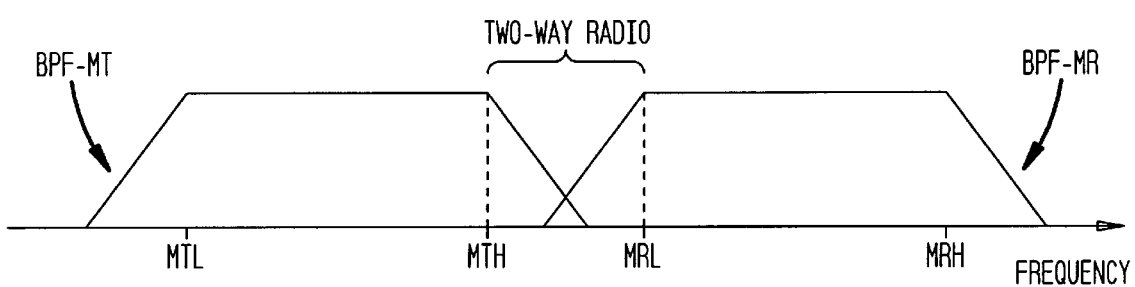
FIG. 3 illustrates typical mobile transmit and mobile receive frequency bands, as well as the in-between frequencies used for two-way radio communication according to the present invention.

FIG. 3 illustrates the band pass filtering results of the duplexer 220. In FIG. 3, the lower boundary of the mobile transmit band is designated as MTL (mobile transmit low), the upper mobile transmit band boundary is designated as MTH (mobile transmit high), the lower boundary of the mobile receive band is designated as MRL, and the upper boundary of the mobile receive band is designated as MRH. Although the example shown in FIG. 3 specifies that the frequencies in the mobile transmit band are lower than the frequencies in the mobile receive band, the mobile transmit frequency band could be higher than the mobile receive frequency band. As shown in FIG. 3, the filtering characteristics of the BPF MT 222 and the BPF MR 224 create a roll-off effect, such that the duplexer 220 only partially attenuates frequencies between MTH and MRL. In accordance with the present invention, such in-between frequencies are used for low-power, short-range communication during the W-T mode.

Referring again to FIG. 1, the dual mode transmitter/receiver 200 includes a configuration for performing typical mobile RF transmission. Specifically, the dual mode transmitter/receiver 200 includes an input audio amplifier 204 which receives an analog audio signal from the speech input 22 and amplifies the analog audio signal. A speech encoder 206 receives the amplified analog audio signal from the input audio amplifier 204, digitizes the amplified analog audio signal, and encodes, using for example linear predictive encoding, the digitized audio signal to generate an encoded audio bit stream. A first digital processor 208 receives the encoded audio bit stream from the speech encoder 206 and digitally processes the encoded audio bit stream, using such techniques as encryption and error correction coding.

A modulator 214 receives the digitally processed audio bit stream from the first digital processor 208, and receives an RF carrier signal from a frequency synthesizer 212. To generate the RF carrier signal, the frequency synthesizer 212 receives a reference oscillating frequency signal from a reference oscillator 210 and converts the reference oscillation frequency signal to the RF carrier signal.

The modulator 214 modulates the RF carrier signal with the digitally processed audio bit steam, using for example known modulation techniques, to output an RF transmit signal. A transmit amplifier 216 receives the RF transmit signal from the modulator 214 via a first mobile phone to walkie-talkie (MP-WT) switch 272 and amplifies the RF transmit signal. The duplexer 220 receives the amplified RF transmit signal from the transmit amplifier 216 via a second MP-WT switch 274 and filters out frequencies from the amplified RF transmit signal which are below MTL and above MTH, as discussed above. The antenna 23 receives the filtered Tx signal from the duplexer 220 and transmits the filtered Tx signal to a cellular network base station.

The dual mode transmitter/receiver 200 further includes a configuration for performing typical mobile RF reception. Specifically, the dual mode transmitter/receiver 200 includes an RF amplifier 232 which receives the Rx signal from the duplexer 220 via a third MP-WT switch 277 and amplifies the Rx signal.

A mixer 234 receives the amplified Rx signal from the RF amplifier, and receives a mixing frequency signal from the frequency synthesizer 212. For reception, the frequency synthesizer 212 converts the reference oscillating frequency signal from the reference oscillator 210 to a frequency which, when mixed with the amplified Rx signal by the mixer 234, results in an intermediate frequency (IF) which is suitable for subsequent demodulation. The mixer 234 mixes the amplified Rx signal with the mixing frequency signal to generate an IF Rx signal. An IF amplifier 235 receives the IF Rx signal from the mixer 234 and amplifies the IF Rx signal.

A demodulator 236 receives the amplified IF Rx signal from the IF amplifier 235 and demodulates the amplified IF Rx signal to recover an Rx bit stream. A second digital processor 238 receives the Rx bit stream from the demodulator 236 and digitally processes the Rx bit steam, for example to achieve decryption and error correction. A speech decoder 240 receives the digitally processed Rx bit stream from the second digital processor 238 and decodes the digitally processed Rx bit steam to recover an original audio signal. Finally, an output audio amplifier 242 receives the original audio signal from the speech decoder 240 via a fourth MP-WT switch 279 and amplifies the original audio signal. The speech output 24 receives the amplified original audio signal from the output audio amplifier 242 and outputs the amplified original audio signal to the user.

To provide two-way radio functionality, the dual mode transmitter/receiver 200 includes a walkie-talkie (WT) module 280 which generates W-T mode transmission signals in the in-between frequency band, and retrieves audio signals from RF signals received during the W-T mode. The dual mode transmitter/receiver 200 further includes a controller 260 for controlling the positioning of the first MP-WT switch 272, the second MP-WT switch 274, the third MP-WT switch 277, and the fourth MP-WT switch 279 to enable switching between normal operation and the W-T mode. The dual mode transmitter/receiver 200 further includes a first listen-talk (L-T) switch 276, positioned between the second MP-WT switch 274 and the duplexer 220, and a second L-T switch 278, positioned between the third MP-WT switch 277 and the RF amplifier 232. The controller 260 sets the positioning of the first and second L-T switches 276 and 278 in a manner discussed below to achieve time-division duplexing.

As illustrated in FIG. 1, the WT module 280 receives the amplified audio signal ("Voice in") from the input audio amplifier 204, the reference oscillating signal ("Ref Osc in") from the reference oscillator 210, and the amplified Rx signal ("RF Rx in") from the RF amplifier 232. The WT module 280 also receives a control signal, WT SW ACT, from the controller 260 which indicates when the W-T mode has been initiated, and a channel selection signal ("Channel Select in") from the controller 260 which indicates a frequency channel selected during W-T mode.

The WT module 280 outputs an RF transmission signal ("RF tx out") to the transmit amplifier 216 via the first MP-WT switch 272, an audio output signal ("Audio out") to the output audio amplifier 242 via the fourth MP-WT switch 279, and a display output signal ("Display out") to the mobile's display processor (not shown) to control certain user displays which are specific to the W-T mode.

Figure 4:
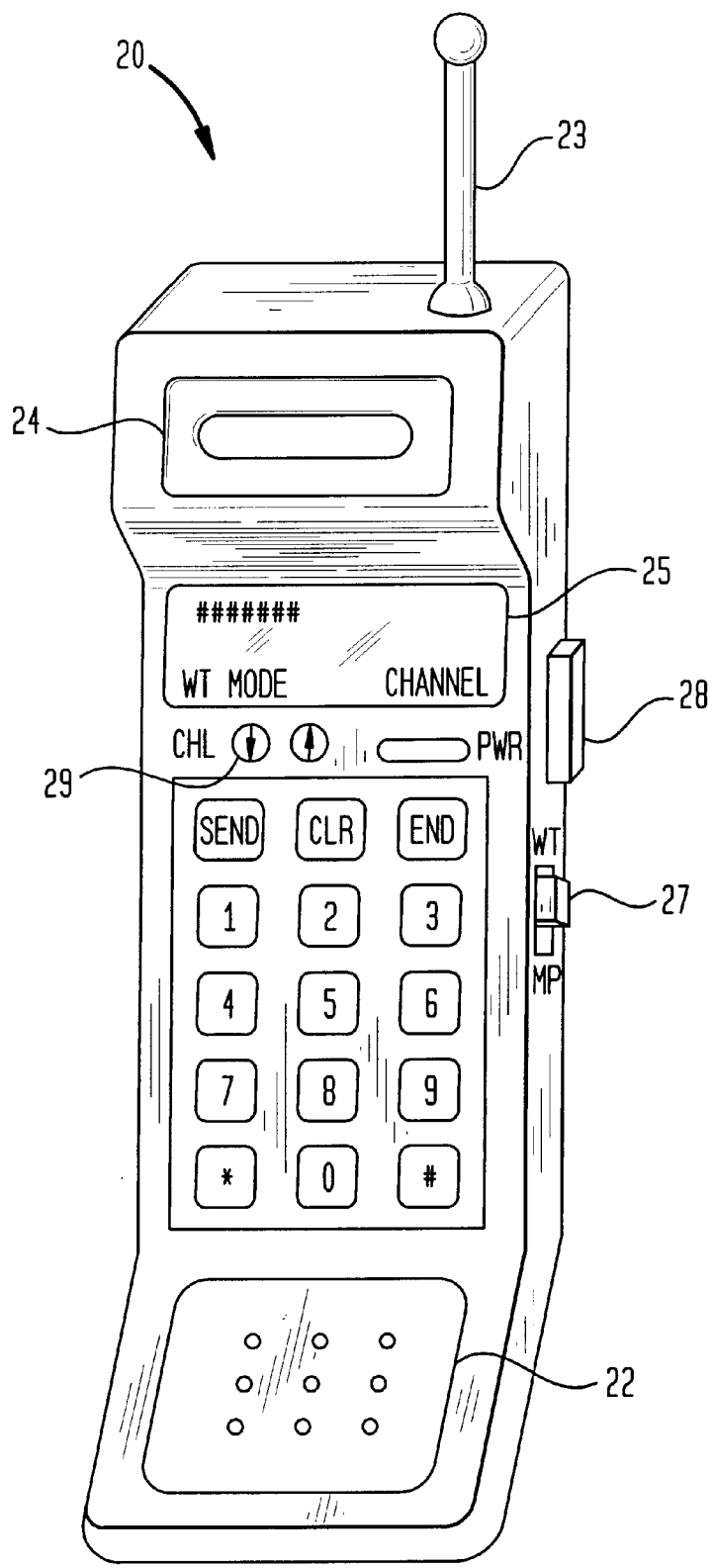
FIG. 4 illustrates certain external features of the dual mode mobile according to an embodiment of the present invention.

FIG. 4 illustrates the external features of the dual mode mobile which enables the user to initiate and operate in W-T mode. Specifically, the mobile includes a MP-WT button 27 which the user sets to the MP position for cellular service, and sets to the WT position for two-way radio communication. As illustrated in FIG. 4, the mobile further includes a push-to-talk (PTT) button 28 which the user presses to transmit during the W-T mode. In contrast to frequency division duplexing which allows a user to speak and listen simultaneously, two-way radio communication typically transmits and receives at the same frequency, thus restricting the user to either speaking or listening at a give time (i.e., time-division duplexing). Therefore, in a manner discussed below, the dual mode mobile either transmits or receives during W-T mode depending on whether the user is pressing the PTT button 28.

As illustrated in FIG. 4, the mobile further includes a channel select button 29 which allows the user to change the frequency used for two-way radio communication during the W-T mode, for example when the user experiences interference on the original channel. A display 25 displays to the user certain W-T mode specific information, such as an indication that the mobile is operating in W-T mode and what channel is being used.

Referring again to FIG. 1, the controller 260 receives: a WT select signal from the MP-WT button 27 indicating whether the MP-WT button 27 is set to the MP or WT position; a Push-to-Talk signal from the PTT button 28 indicating whether the user is pressing the PTT button 28; and a Channel Select signal from the channel select button 29 indicating when the user wishes to change frequency channels during the W-T mode.

The controller 260 outputs the WT SW ACT signal to the first, second, third, and fourth MP-WT switches 272, 274, 277, and 279, and the WT module 280 when the MP-WT button 27 is set in the WT position. The controller 260 further outputs a second control signal, PTT SW ACT, to the first and second L-T switches 276 and 278 and the WT module 280 when the user presses the PTT button 28. As discussed below, the controller 260 selectively sets the first L-T switch 276 and the second L-T switch 278 to control time-division duplexing during the W-T mode. The controller 260 further outputs a third control signal, "Channel Select in," to the WT module 280 to control the frequency, in the in-between band, used for the W-T mode.

Figure 5:
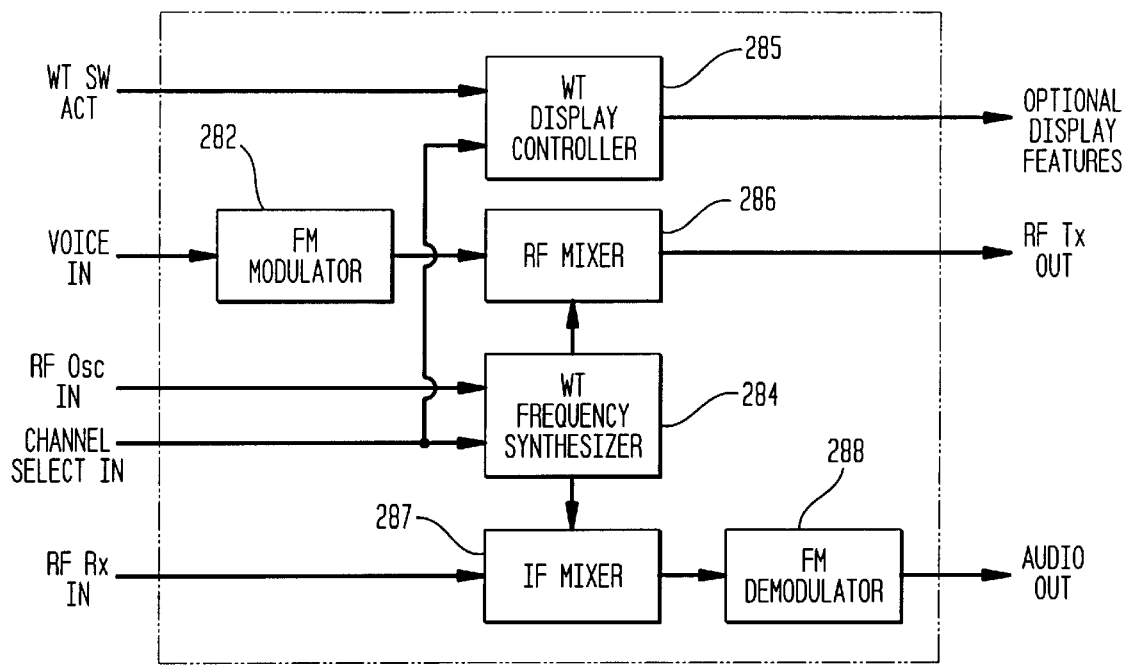
FIG. 5 is a block diagram illustrating a configuration of the walkie-talkie module shown in FIG. 1.

As illustrated in FIG. 5, the WT module 280 includes an FM modulator 282 which receives the "Voice in" signal from the input audio amplifier 204, and frequency modulates a reference signal in accordance with "Voice in," using for example direct frequency modulation, to generate an FM signal. An RF mixer 286 receives the FM signal from the frequency modulator 282 and receives a mixing frequency signal from a WT frequency synthesizer 284. To generate the mixing frequency signal, the WT frequency synthesizer 284 receives the "Ref OSC in" signal from the reference oscillator 210, and converts "Ref OSC in" to a frequency which, when mixed with the FM signal by the RF mixer 286, produces an RF signal used for two-way radio communication. The RF frequency synthesizer 284 further receives the "Channel Select input" signal from the controller 260 to selectively change the RF within the in-between frequency band used for two-way radio communication.

The RF mixer 286 converts the FM signal to an RF transmit signal used for two-way radio communication (i.e., at a frequency in the in-between frequency band). The transmit amplifier 272 receives the RF transmit signal, "RF Tx out," from the RF mixer 286 via the first MP-WT switch 272 during the W-T mode.

For extracting audio signals from RF signals received during the W-T mode, the WT module 280 further includes an IF mixer 287 which receives the "RF Rx in" signal from the RF amplifier 232. The IF mixer 287 also receives a mixing frequency signal from the WT frequency synthesizer 284 to down-convert the "RF Rx in" signal to an IF signal. An FM demodulator 288 receives the IF signal from the IF mixer 287 and demodulates the IF signal to recover an original audio signal. The output audio amplifier 242 receives the original audio signal, "Audio out," from the FM demodulator 288 during the W-T mode via the fourth MP-WT switch 279.

A WT display controller 285 receives WT SW ACT and "Channel Select in" from the controller, and outputs display control signals to the mobile's display processor (not shown) so that the mobile displays certain W-T display features to the user as discussed above.

Next, the operation of initiating and operating in the W-T mode will next be described. In the description of the transmitter and receiver configurations above, it was assumed that the mobile was in the normal operating mode, and thus the first, second, third, and fourth MP-WT switches 272, 274, 277, and 279 were in the MP position. When the first, second, third, and fourth MP-WT switches 272, 274, 277, and 279 are set in the MP position, the dual mode transmitter/receiver 200 enables normal cellular communication using frequency division duplexing to transmit and receive to/from a cellular network base station.

When a user wishes to communicate directly with a similarly equipped mobile, the user initiates the W-T mode by moving the MP-WT button 27 from MP to WT. The controller 260 then outputs the WT SW ACT signal to the first, second, third, and fourth MP-WT switches 272, 274, 277, and 279 to set these switches to the WT position. In the WT position, the first MP-WT switch 272 connects the input of the transmit amplifier 216 to the "RF Tx out" signal of the WT module 280, the second MP-WT switch 274 connects the output of the transmit amplifier 216 to the first Listen-Talk ("L-T") switch 276, the third MP-WT switch 277 connects the output of the duplexer 220 to the second L-T switch 278, and the fourth MP-WT switch 279 connects the input of the output audio amplifier 242 to the "Audio out" signal of the WT module 280.

After the user has initiated the W-T mode using the MP-WT button 27, when the user presses the PTT button 28 the controller 260 outputs the PTT SW ACT signal to the first and second L-T switches 276 and 278 to set the first and second L-T switches 276 and 278 to the T position. In the T position, the first L-T switch 276 connects the second MP-WT switch 274 to the duplexer 220 so that the "RF Tx out" signal from the WT module 280 is transmitted by the antenna 23 after passing through the transmit amplifier 216 and the duplexer 220. Also, in the T position, the second L-T switch 278 disconnects the Rx output of the duplexer 220 from the RF amplifier 232. Therefore, when the user presses the PTT button 28 during the W-T mode, two-way radio transmission of input audio signals from the speech input 22 is realized using the WT module 280, but the reception signals from the duplexer 220 are not received by the WT module 280.

On the other hand, when the user does not press the PTT button 28 during the W-T mode, the first and second L-T switches 276 and 278 remain in the L position. In the L position, the first L-T switch 276 disconnects the output of the transmit amplifier 216 from the input of the duplexer 220 and the second L-T switch 278 connects the Rx output of the duplexer 220 to the RF amplifier 232. Therefore, the WT module 280 receives Rx from duplexer 220, after amplification by the RF amplifier 232, as the "RF Rx in" signal and retrieves an original audio signal using the FM demodulator 288 described above. Accordingly, the first and second L-T switches 276 and 278 enable time-division duplexing during the W-T mode.

As discussed above, the duplexer configuration illustrated in FIG. 2 partially attenuates frequencies used for two-way radio communication. Since the W-T mode is generally intended for communication over relatively short distances and at low power, this attenuation does not preclude acceptable signal levels at selected frequencies between MTH and MRL. An alternative duplexer 220 configuration, however, may be utilized to minimize attenuation in the two-way radio frequency band.

Figure 6:
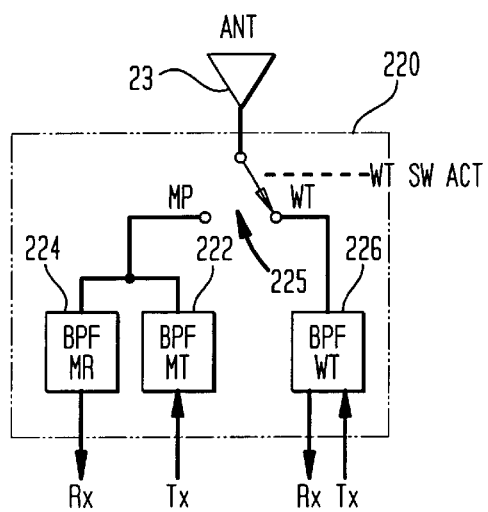
FIG. 6 illustrates an alternative duplexer configuration according to an embodiment of the present invention.

FIG. 6 illustrates such an alternative duplexer configuration in accordance with an embodiment of the present invention. The duplexer 220 shown in FIG. 6 includes an additional band pass filter, BPF WT 226, in addition to the BPF MT 222 and the BPF MR 224 discussed above. The alternative duplexer 220 shown in FIG. 6 further includes a fifth MP-WT switch 225 which connects the BPF MT 222 and the BPF MR 224 to the antenna 23 when set to the MP position and thus results in a duplexer operation the same as that in FIG. 2). The fifth MP-WT switch 225 receives the WT SW ACT signal from the controller 260 when the user positions the MP-WT button 27 to the WT position to temporarily disconnect both the BPF MT 222 and the BPF MR 224 from the antenna 23, and instead connects the BPF WT 226 to the antenna 23.

Figure 7:
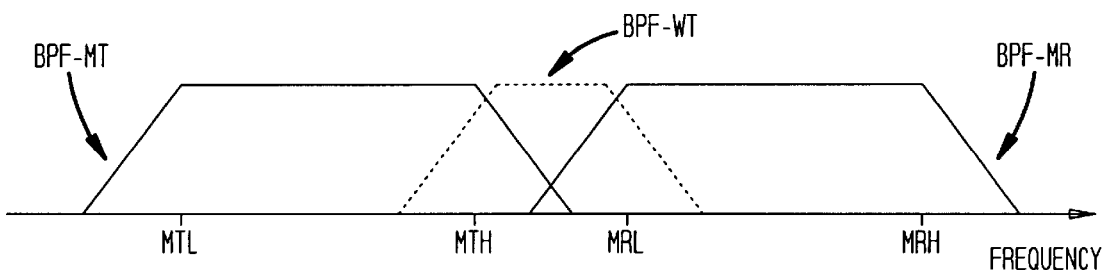
FIG. 7 illustrates the filtering results for the mobile transmit, mobile receive, and the in-between frequency bands using the alternative duplexer configuration of FIG. 6.

FIG. 7 illustrates the filtering results for this alternative duplexer configuration. As illustrated in FIG. 7, the BPF WT 226 filters out frequencies below MTH and above MRL for two-way radio communication. Furthermore, since the BPF MT 222 and the BPF MR 224 are disconnected from the antenna 23, frequencies between MTH and MRL are not attenuated. Therefore, the alternative duplexer configuration illustrated in FIG. 6 eliminates the attenuation of signals in the in-between frequency band caused by the BPF MT 222 and the BPF MR 224.

As the above discussion illustrates, the dual mode receiver/transmitter 200 utilizes the duplexer 220, the antenna 23, the reference oscillator 210, the input audio amplifier 204, the transmit amplifier 216, the RF amplifier 232, and the output audio amplifier 242 in both normal and W-T operating modes. Thus two-way radio functionality is implemented efficiently, by reducing the number of additional components required. Therefore, the dual mode mobile according to the present invention, in which frequencies between the normal mobile transmit and receive bands are used for the W-T mode, allows substantial design efficiencies.

Furthermore, the dual mode mobile according to the present invention has particular applicability to PCS devices, which are cellular devices licensed to transmit at frequencies in the range of 1850–1910 Mhz and receive at frequencies in the range of 1930–1990 Mhz. Under current FCC regulations, frequencies in the range of 1910–1930 Mhz are reserved for unlicensed communication. Therefore, as incorporated in a PCS mobile, the dual mode transmitter/receiver 200 according to the present invention operates at frequencies between 1910–1930 Mhz during the W-T mode, and thus can operate in accordance with current FCC licensing regulations.

The dual mode mobile described herein is suitable for use in Time Division Multiple Access (TDMA), Code Division Multiple Access (CDMA), and Global System for Mobile (GSM) cellular service systems, as well as other types of cellular networks. Furthermore, although the dual mode transmitter/receiver 200 illustrated in FIG. 1 incorporates digital mobile telephone technology, the technique of two-way radio communication between normal mobile transmit and receive bands is applicable to analog mobiles, such as those used in Advanced Mobile Phone Service (AMPS) systems, as well as other communication devices which normally transmit and receive at separated frequency bands. Furthermore, although the WT module 280 has been described as using frequency modulation/demodulation, it should be realized that the WT module 280 could utilize other modulation techniques. Still further, although the input/output signals of the dual mode transmitter/receiver 200 described above were audio signals, the dual mode transmitter/receiver 200 is also applicable to other types of communication signals, such as data signals.

What is claimed is:

1. A dual-function mobile phone that operates as a mobile phone during a normal operating mode and as a two-way radio during a supplemental operating mode, comprising:

a receiver receiving at a frequency in a first frequency band during said normal operating mode to receive communication from another device via a base station that transmits at the frequency in said first frequency band and receiving at a frequency in a second frequency band during said supplemental operating mode to receive direct communication from another dual-function mobile phone transmitting in said second frequency band; and a transmitter transmitting at a frequency in a third frequency band during said normal operating mode to transmit communication to a base station and transmitting at a frequency in said second frequency band during said supplemental operating mode to directly communicate with another dual-function mobile phone that receives at a frequency in said second frequency band, said second frequency band being in-between said first frequency band and said third frequency band.

2. The dual-function mobile phone according to claim 1, wherein said dual-function mobile phone is a digital mobile phone.

3. The dual-function mobile phone according to claim 1, wherein said second frequency band is unlicensed.

4. The dual-function mobile phone according to claim 1, wherein said device is a personal communication service mobile phone;

said first frequency band is 1930–1990 Mhz; and said third frequency band is 1850–1910 Mhz.

5. The dual-function mobile phone according to claim 1, further comprising:

a controller for controlling said receiver and said transmitter to receive/transmit at a frequency in said second frequency band during said supplemental operating mode.

6. The dual-function mobile phone according to claim 5, further comprising:

a supplemental operating mode module for generating a communication signal at a frequency in said second frequency band during said supplemental operating mode, and retrieving information from a signal received from a remote communication device during said supplemental operating mode.

7. The dual-function mobile phone according to claim 5, further comprising:

a plurality of switches each receiving a control signal from said controller to initiate said supplemental operating mode.

8. The dual-function mobile phone according to claim 1, further comprising:

a duplexer for filtering out frequencies outside said second frequency band during said supplemental operating mode.

9. The dual-function mobile phone according to claim 8, wherein said duplexer comprises:

a first band pass filter for filtering out frequencies in a received signal which are outside said first frequency band during said normal operating mode;

a second band pass filter for filtering out frequencies in a signal to be transmitted during said normal operating which are outside said third frequency band; and a third band pass filter for filtering out frequencies outside said second frequency band during said supplemental operating mode.

10. The dual-function mobile phone according to claim 1, wherein said receiver includes receiver circuitry that is utilized during both said normal operating mode and said supplemental operating mode and said transmitter includes transmitter circuitry that is utilized during both said normal operating mode and said supplemental operating mode.

11. The dual-function mobile phone according to claim 10, wherein said receiver circuitry that is utilized during both said normal operating mode and said supplemental operating mode includes a reference oscillator and an RF receive amplifier.

12. The dual-function mobile phone according to claim 10, wherein said transmitter circuitry that is utilized during both said normal operating mode and said supplemental operating mode includes a reference oscillator and an RF transmit amplifier.

13. The dual-function mobile phone according to claim 1, further comprising:

an antenna that receives and transmits RF signals during both said normal operating mode and said supplemental operating mode.

14. The dual-function mobile phone according to claim 1, further comprising:

a duplexer that is functional during both said normal operating mode and said supplemental operating mode.

15. The dual-function mobile phone according to claim 14, wherein said duplexer filters frequencies outside said first frequency band and said third frequency band during both said normal operating mode and said supplemental operating mode.

16. The dual-function mobile phone according to claim 1, wherein said dual-function mobile phone is an analog mobile phone.

17. A method for transmitting/receiving that enables a dual-function mobile phone to operate as a mobile phone during a normal operating mode and as a two-way radio during a supplemental operating mode, said method comprising:

controlling the dual-function mobile phone to receive at a frequency in a first frequency band during said normal operating mode to receive communication from another device via a base station that transmits at the frequency in said first frequency band and to receive at a frequency in a second frequency band during said supplemental operating mode to receive direct communication from another dual-function mobile phone transmitting in said second frequency band; and controlling the dual-function mobile phone to transmit at a frequency in a third frequency band during said normal operating to transmit communication to a base station and to transmit at a frequency in said second frequency band during said supplemental operating mode to directly communicate with another dual-function mobile phone that receives at the frequency in said second frequency band, said second frequency band being between said first frequency band and said third frequency band.

18. The method according to claim 17, wherein the dual-function mobile phone is a digital mobile phone.

19. The method according to claim 17, wherein said second frequency band is an unlicensed frequency band.

20. The method according to claim 17, wherein said first frequency band is 1930–1990 Mhz and said third frequency band is 1850–1910 Mhz.

21. The method according to claim 17, further comprising:

filtering out frequencies which are outside said second frequency band during said supplemental operating mode.

22. The method according to claim 17, wherein the dual-function mobile phone is an analog mobile phone.

* * * * *